UNITED STATES PATENT OFFICE.

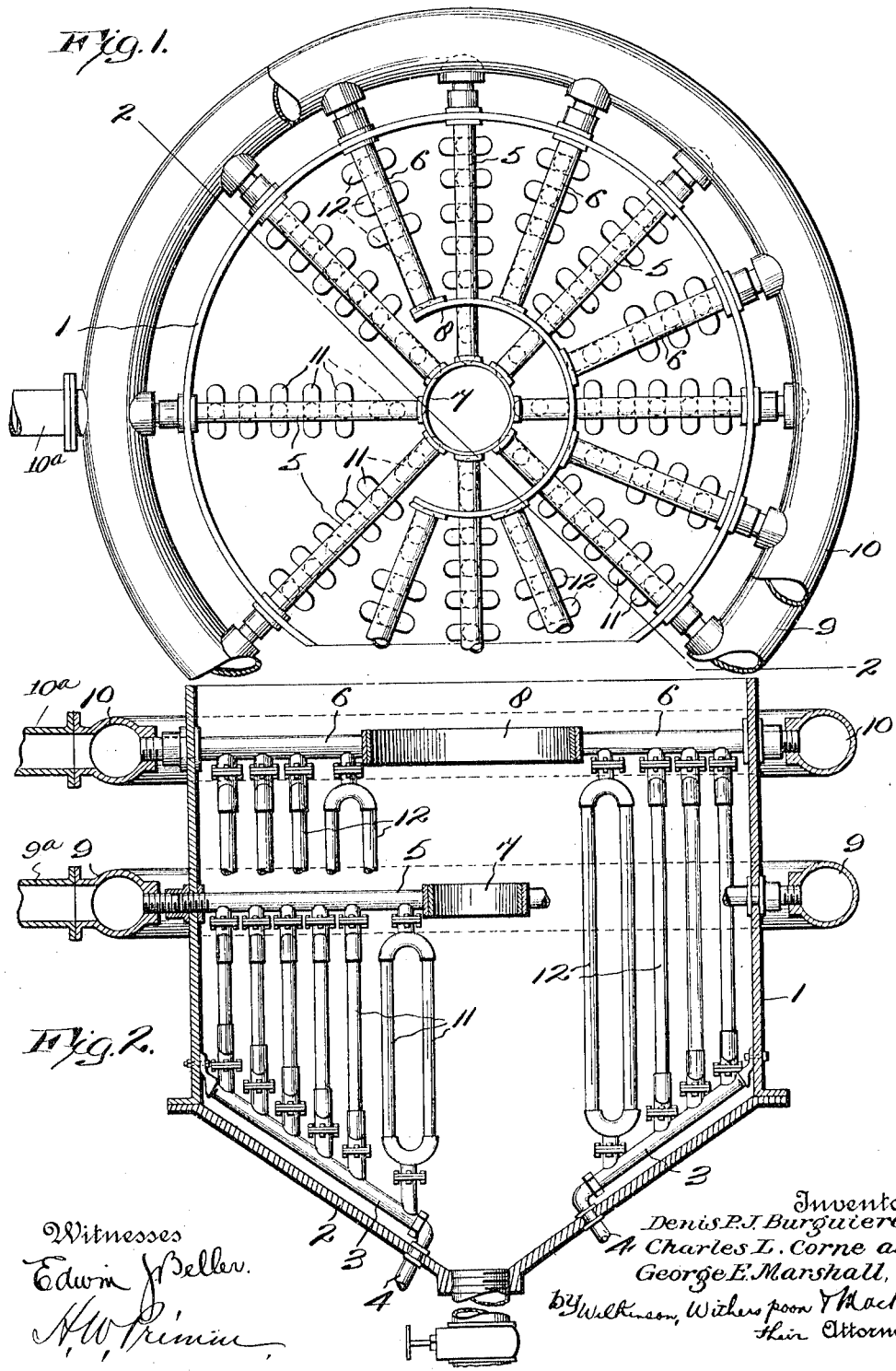

DENIS P. J. BURGUIERES, CHARLES L. CORNE, AND GEORGE E. MARSHALL, OF NEW ORLEANS, LOUISIANA.

EVAPORATING APPARATUS.

1,072,307.  Specification of Letters Patent.  Patented Sept. 2, 1913.

Application filed January 27, 1913. Serial No. 744,567.

*To all whom it may concern:*

Be it known that we, DENIS P. J. BURGUIERES, CHARLES L. CORNE, and GEORGE E. MARSHALL, citizens of the United States, residing at New Orleans, in the parish of Orleans and State of Louisiana, have invented certain new and useful Improvements in Evaporating Apparatus; and we do hereby declare the following to be a full, clear, and exact description of the invention, such as will enable others skilled in the art to which it appertains to make and use the same.

Our invention relates to improvements in evaporating apparatus and it consists in the constructions, combinations and arrangements herein described and claimed.

An object of our invention is to provide an improved evaporating apparatus constructed to operate economically with low pressure steam for producing an efficient distribution of heat over the entire heating surface.

A further object of our invention is to provide an improved evaporating apparatus constructed to permit a free unobstructed circulation of the liquid under treatment and to transmit the heat to all portions of said liquid.

A further object of our invention is to provide an improved vacuum pan adapted to insure an active circulation of the thick masquite and to produce uniform crystals with a minimum occurence of false grain.

A further object of our invention is to provide a simple and durable vacuum pan constructed to maintain the heating surface clean and to prevent clogging and crushing of the heating tubes by the deposition of sugar thereon.

In the accompanying drawings, forming a part of this application, and in which similar reference symbols indicate corresponding parts in the several views:—

Figure 1 is a plan view, partly broken away, illustrating one embodiment of our invention; and Fig. 2 is a section on the line 2—2 of Fig. 1.

Referring to the drawings, 1 indicates an evaporating apparatus, such as a vacuum pan, provided with a conical base 2, on which is supported a lower diverging series of manifolds 3 provided with drain pipes 4. A plurality of upper diverging series of manifolds 5 and 6 extend from the walls of the apparatus at different levels and are rigidly connected at their inner ends to central bracing rings 7 and 8, respectively; the several manifolds of each upper series being spaced vertically over the alternate manifolds 3 of said lower diverging series. The outer ends of the manifolds 5 and 6 are shown connected to annular steam pipes 9 and 10 provided with pipes $9^a$ and $10^a$ for supplying steam independently to each manifold series.

A series of branched, or looped, radiator sections 11 extend vertically between the several manifolds 5 and the corresponding manifolds 3 of the lower diverging series, and a similar series of radiator sections 12 extend between the several manifolds 6 and the alternate lower manifolds 3.

In order to secure a uniform distribution of the heating surface through the mass of the liquid in the apparatus, the outer radiator sections 11 and 12 are arranged with their branches extending perpendicular to the connected manifolds; the inner radiator sections of each series being arranged with their branches extending parallel to the connected manifolds in order to provide a maximum heating surface without interference between the radiator sections at the inner ends of the diverging manifold series. This provides an improved construction in which the steam passing simultaneously through the several relatively short radiator sections insures an efficient heating, and the vertically-arranged series of radiator sections transmit heat uniformly to all portions of the liquid in the apparatus and permit a free unobstructed circulation of said liquid. This insures an active circulation of the liquid under treatment, which tends to maintain the heating surface of the radiator sections clean and to prevent the deposition of matter thereon.

The series of manifolds 5 are preferably arranged at a relatively low level in the apparatus, to enable the radiator sections to be efficiently employed for starting the boiling at a low stage of the masquite, or other liquid; the manifold 6 being supplied with steam as the liquid rises in the apparatus to cover the radiator sections 12. It will be obvious that additional groups of longer radiator sections could be readily employed and connected to similar series of manifolds spaced above the manifolds 6, if desired.

We have illustrated and described preferred and satisfactory constructions, but changes could be made within the spirit and scope of our invention.

We claim:—

1. In an evaporating apparatus, the combination of a casing, a lower diverging series of manifolds therein, a plurality of upper diverging series of manifolds spaced at different heights above said lower series, vertical radiator sections connecting the manifolds of each upper series with those of the lower series, and means for circulating a heating medium through said manifolds and radiator sections.

2. In an evaporating apparatus, the combination of a casing, a diverging series of manifolds therein, a central open member within said casing rigidly connecting the inner ends of said diverging manifolds, vertical radiator sections extending downward from said manifolds, and means for circulating a heating medium through said manifolds and radiator sections.

3. In an evaporating apparatus, the combination of a casing, a plurality of vertically-spaced diverging series of manifolds therein, central open members rigidly connecting the inner ends of the manifolds of said several diverging series, vertical radiator sections extending downward from said manifolds, and means for circulating a heating medium through said manifolds and radiator sections.

In testimony whereof, we affix our signatures, in presence of two witnesses.

DENIS P. J. BURGUIERES.
CHARLES L. CORNE.
GEORGE E. MARSHALL.

Witnesses:
L. Jeff. Frederic,
L. P. Beard.

---

Copies of this patent may be obtained for five cents each, by addressing the "Commissioner of Patents, Washington, D. C."